United States Patent [19]

Duclos et al.

[11] 4,223,763

[45] Sep. 23, 1980

[54] KINETIC ENERGY ABSORBER

[75] Inventors: Didier A. Duclos, Charenton; Pierre F. Coutin, Paris, both of France

[73] Assignee: R. Alkan & Cie, France

[21] Appl. No.: 967,177

[22] Filed: Dec. 6, 1978

[30] Foreign Application Priority Data

Dec. 27, 1977 [FR] France .................. 77 39286

[51] Int. Cl.² .............................................. F16F 7/12
[52] U.S. Cl. ...................................... 188/1 C; 74/492
[58] Field of Search ............... 188/1 C, 129; 293/133; 74/492, 493; 213/220, 222

[56] References Cited

U.S. PATENT DOCUMENTS

| 2,483,655 | 10/1949 | Schultz | 188/1 C |
| 3,428,150 | 2/1969 | Muspratt | 188/1 C |
| 3,714,859 | 2/1973 | Tupper | 293/133 |
| 3,820,634 | 6/1974 | Poe | 188/1 C |
| 3,968,863 | 7/1976 | Reilly | 188/1 C |

FOREIGN PATENT DOCUMENTS

| 1933524 | 1/1971 | Fed. Rep. of Germany | 188/1 C |
| 1193616 | 6/1970 | United Kingdom | 188/1 C |
| 1345170 | 1/1974 | United Kingdom | 74/492 |

*Primary Examiner*—Edward R. Kazenske
*Attorney, Agent, or Firm*—William A. Drucker

[57] ABSTRACT

This device for absorbing the kinetic energy resulting from the relative motion between two bodies comprises a tubular test-element attached to one body and a pressure member rigid with the other body and contacting a suitable longitudinal profile of the test-tube, so that during the relative movement of the two bodies the movement of the pressure member, for example in the form of a carriage provided with pairs of rollers, is attended by a plastic deformation of the cross-sectional contour of the test-tube.

12 Claims, 24 Drawing Figures

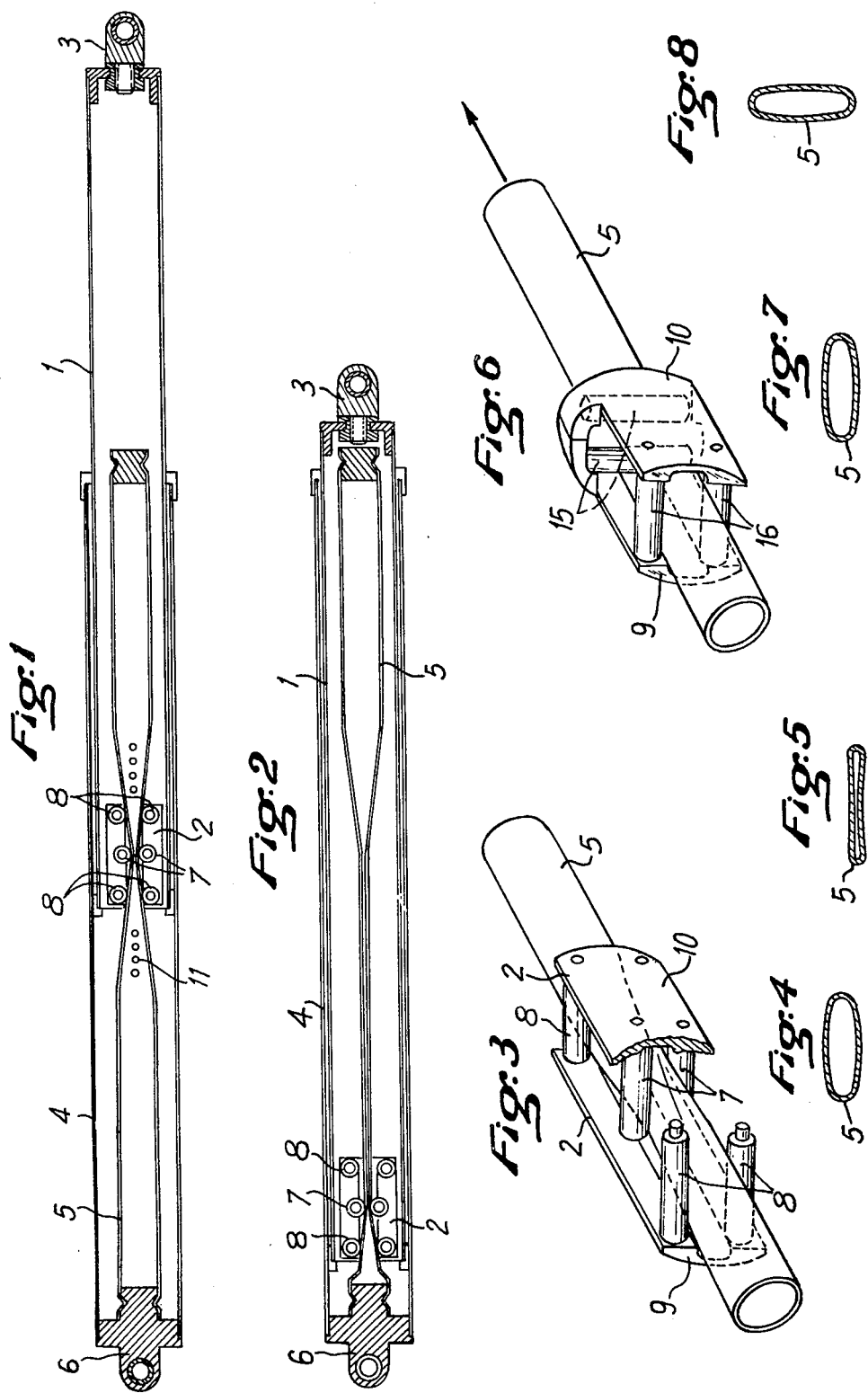

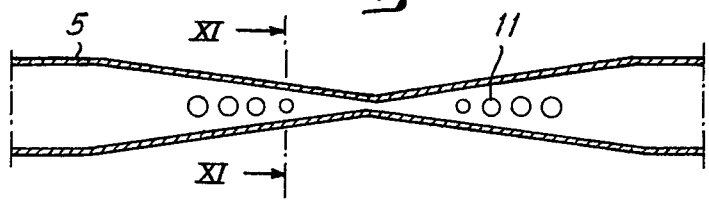
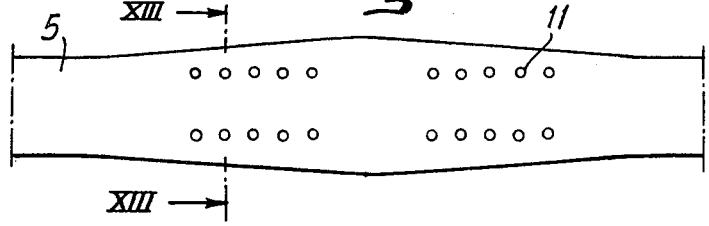
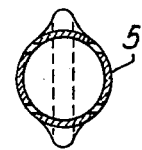
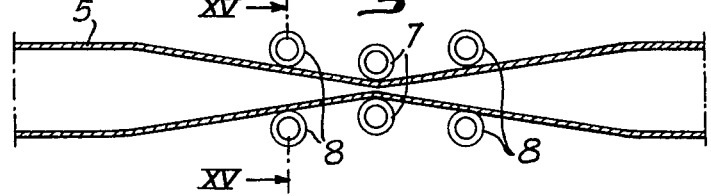
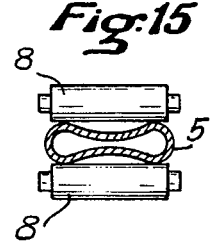
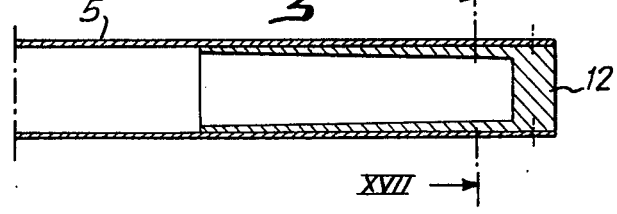
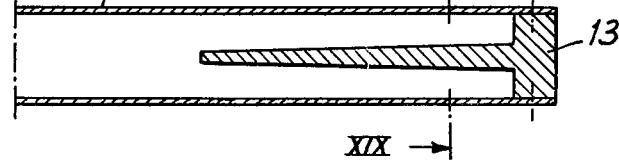
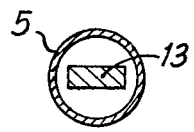
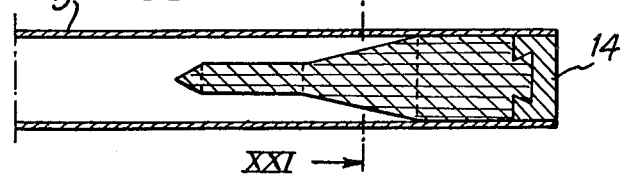
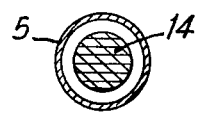

KINETIC ENERGY ABSORBER

BACKGROUND OF THE INVENTION

FIELD OF THE INVENTION

The present invention is directed to improved kinetic energy absorbers in general and more particularly to devices for absorbing the kinetic energy developing during the relative movement of two solid bodies, with particular but not exclusive reference to devices of this character intended more specifically for use in helicopters and similar flying machines, in which they are interposed between a mass to be protected in case of crash or emergency landing, on the one hand, and the frame structure of the helicopter, on the other hand.

Since a living organism or a fragile material or equipment cannot be subjected to an abnormally high acceleration or deceleration without suffering severe damages, it is necessary under certain circumstances to limit these parameters to a predetermined value. So-called "energy absorbers" have been proposed, for use notably on helicopters, which are interposed between the mass to be protected and the helicopter structure proper.

When a helicopter is forced to land abruptly and precariously, whether voluntarily or accidentally, these devices act as shock absorbers by gradually dissipating or damping out the kinetic energy corresponding for example to the pilot mass and to the velocity of this mass when the shock is applied thereto.

Since the direction of the efforts is unknown or at least uncertain when the shock or crash takes place, the complete damping system comprises a number of energy absorbing elements having different orientations so that the assembly can react efficiently in all cases.

The present invention relates more particularly to the construction of one of these component elements, although it is advantageously applicable to the absorption of kinetic energy in many different structures.

SUMMARY OF THE INVENTION

The present invention is based on the principle that the kinetic energy is absorbed by the permanent, gradual deformation of the cross section of a tube to be referred to hereinafter as a "test-tube", this deformation resulting from the movement, along the tube, of a member capable of causing the distortion of the tubular wall, for example a carriage-like member. It is clear that the energy thus absorbed is a function on the one hand of the resistance of the test-tube to its deformation, that is, of the force counteracting the carriage movement, and on the other hand of the magnitude of this movement. More particularly, if L is the carriage stroke and F the interaction force counteracting the movement dl of the carriage, the absorbed energed is $$W = \int_o^L F \cdot dl$$

Considering the specific case of an application to a helicopter, one end of the test-tube is attached to the pilot's seat and the carriage is anchored to the helicopter structure, or vice-versa. The anchor points consist of ball-joints so that only axial stress, whether in traction or compression, are transmitted to the absorber, irrespective of the relative path between one anchor point to the other when the shock takes place. This relative path may cause the anchor points to move either towards or away from each other; therefore, it is contemplated on the one hand that the normal initial position of the carriage is intermediate the anchor points and on the other hand that the device is guided by a sliding telescopic assembly so that in case of compressive efforts the test-tube will not buckle in the distorted, for example flattened section thereof. This telescopic assembly may comprise for example a first tube carrying at one end of the ball-joints and having its other end rigidly connected to the carriage, and a second tube sliding on the first tube and carrying at its free outer end the other ball-joint, this free outer end constituting the anchor point of the test-tube unit. The pair of telescopic tubes are calculated to have a strength sufficient to withstand buckling efforts and also to protect the energy absorber from any disturbance not connected with its normal field of operation.

The carriage may also be disposed externally of the test-tube and act thereon as a clamp so as to flatten it progressively, but an internal mounting may also be contemplated, the carriage causing the distortion of the test-tube by swelling.

Various ways of providing the carriage with several pairs of parallel rollers are contemplated. If the energy to be absorbed by flattening the test-tube is relatively great, it is preferable to use three pairs of parallel rollers, namely an intermediate pair having a relatively short distance between centers for causing the maximal flattening of the test-tube, and two pairs having a relatively greater distance between centers for starting the test-tube deformation. If the energy to be dissipated is not so great and rebound is likely to occur, a device capable of operating firstly in one direction and then in the opposite direction is provided; this device comprises two pairs of parallel rollers, but the axes of the first pair are perpendicular to those of the second pair.

In order to avoid in the device the interference of operating friction contact likely to be responsive to hygrometric, thermal and/or irregular lubrication conditions, it is contemplated to knurl the rollers so that they will roll without slipping in the test-tube. The generatrix of these rollers may if desired be other than rectilinear, for example in harmony with a test-tube having a cross-sectional contour other than circular.

Since the initial position of the tube flattening carriage is intermediate the anchor points, it is contemplated according to this invention to flatten the corresponding section of the test-tube preliminarily, i.e. before assembling the component elements of the device. A two-section carriage is also contemplated so that it can enclose the test-tube. These two sections are subsequently secured to the end of the first telescopic tube so that they are rigid not only with each other but also with the tube proper.

Dynamic tests proved that the resistance offered by the test-tube to the carriage movement was initially greater than that developed by the same carriage during the subsequent continuous movement. On the other hand, to avoid a sharp butting at the end of a stroke, when under abnormally severe circumstances the energy has not been absorbed completely, it is necessary to increase the test-tube resistance during the last few centimeters of the stroke. Finally, the total energy to be absorbed may vary within relatively wide limits, since the mass to be braked (for instance the pilot's mass) and its velocity for example in case for emergency landing may also vary considerably according to cases and circumstances.

To meet these different requirements and also those likely to arise under all circumstances within predetermined limits, a number of arrangements are provided from which a law (or curve) concerning the axial interaction efforts as a function of the relative movement of the carriage with respect to the test-tube is derived.

In the first case it is possible for example to use a test-tube having a constant or variable wall thickness and therefore sections having equal or variable moments of inertia. It is also possible to vary the force with which the test-tube counteracts the carriage movement by applying local heat treatments thereto in order to modify the stiffness of the test-tube metal. Another possibility consists in weakening the test-tube locally by drilling holes of suitable diameters and more or less spaced from each other along one or several generatrices through the tube wall.

In the second case, complementary elements may be provided for reinforcing the end portions of the test-tube and gradually increasing the axial interaction stress at the end of the stroke. For this purpose, it is contemplated to fit into the test-tube another, variable-section tube operating in the same manner as the test-tube proper, or a variable-section axial blade, or still a core of variable-section plastics material. The use of a liquid or gazeous fluid for counteracting the test-tube deformation is also contemplated.

BRIEF DESCRIPTION OF THE DRAWINGS

FIG. 1 is a longitudinal axial section showing the device in its initial position;

FIG. 2 is a similar section showing the device in one of its endmost positions;

FIG. 3 is a perspective of a first type of roller-supporting carriage;

FIGS. 4 and 5 are cross sections showing the test-tube, the first section being taken in a plane containing the axes of a pair of outermost rollers and the other in a plane containing the axes of the central pair of rollers;

FIG. 6 is a perspective view of a second type of roller supporting carriage;

FIGS. 7 and 8 are sections taken in planes containing the axes of two pairs of rollers, respectively;

FIGS. 10 to 13 inclusive are axial longitudinal sections and cross-sections showing examples of holes drilled in the testttube for locally weakening it, FIGS. 11 and 13 being cross sections taken along the lines XI—XI and XIII—XIII of FIGS. 10 and 12, respectively;

FIGS. 14 and 15 illustrate the shape assumed by the test-tube engaged by rollers having parallel axes, in axial section and in cross section taken along the line XV—XV of FIG. 14, respectively;

FIGS. 16 and 17 illustrate a tubular reinforcement at the end of the test-tube, in longitudinal section (FIG. 16) and in cross section taken along the line XVII—XVII of FIG. 16, respectively;

FIGS. 18 and 19 illustrate a reinforcement consisting of a axial blade, shown in axial section and in cross section taken along the line XXI—XXI of FIG. 18;

FIGS. 20 and 21 illustrate a plastics reinforcement in axial section and cross section taken along the line XXI—XXI of FIG. 20, respectively;

DESCRIPTION OF THE PREFERRED EMBODIMENTS

Figure 9:
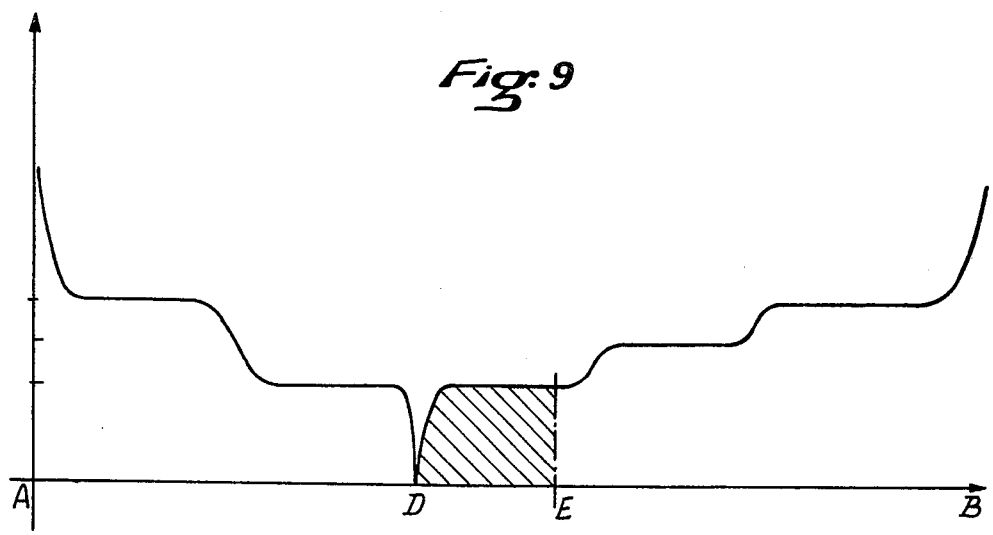
FIG. 9 shows a typical example of a curve corresponding to a predetermined law of variation of the axial interaction effort as a function of the carriage stroke.

Reference will be made firstly to FIG. 1 showing an internal telescopic tube 1 rigidly connected to the carriage 2 and provided with a first ball-joint 3, the reference numeral 4 designating the external telescopic tube rigid with the above-defined test-tube 5 and also with the other ball-joint 6. The carriage 2 is provided with a pair of intermediate parallel rollers 7 having their axes disposed at a relatively short distance between centers in a common plane perpendicular to the tube axis, and two pairs of parallel end rollers 8 having a greater distance between centers than the rollers 7, as shown, the various rollers 7, 8 being consistent with the first type of carriage (FIGS. 1 and 3). The two component elements of the carriage 2 proper are shown at 9 and 10 in FIG. 3. Holes 11 may be drilled through the wall of test-tube 5 for locally reducing the strength of the tube. FIGS. 16 to 21 inclusive illustrate a few exemplary forms of reinforcement, i.e. a tubular reinforcement 12, a blade-shaped reinforcement 13 and an axial reinforcement 14 of plastics material; however, it is clear that different kinds of reinforcements may be used, for example reinforcements consisting of coaxial tubular elements having different lengths, for varying the strength imparted to the tube by such reinforcements.

The mode of operation of the device corresponds to the principles set forth in the foregoing. The assembly remains in its initial position shown in FIG. 1 as long as the compressive or tractive efforts exerted between the ball-joints 3 and 6 are within the threshold beyond which the carriage movement can take place, this movement being counteracted by the stiffness of the test-tube. When this threshold is overstepped, for example in case of abrupt deceleration, the ball-joints 5, 6 move towards or away from each other, according to circumstances, and the telescopic tubes 1, 4 are moved accordingly, the tube 1 carrying along the carriage 2 while the ball-joint 6 retains the test-tube 5. With the first type of carriage (disposed externally of the test-tube) the tube 5 is gradually flattened, with rollers 8 starting the flattening step subsequently completed by the other rollers 7. This flattening action is of course energy-absorbing and counteracts the free movement of carriage 2 along the test-tube 5. It will be noted that a carriage having a different number of rollers may be used and that these rollers may be disposed and distributed differently; thus, a carriage may comprise a single pair of identical rollers, without any intermediate rollers disposed at a shorter distance between centers.

When the second type of carriage (FIG. 6), which comprises for instance one pair of parallel rollers 15 and one pair of rollers 16 having their axes perpendicular to those of rollers 15, is used, the relative movement of the test-tube with respect to the carriage takes place in the direction of the arrow of FIG. 6, the rollers 16 compressing the test-tube 5 so as to impart an elongated configuration thereto with the major axis parallel to the axes of rollers 16 (FIG. 7).

During the passage of rollers 15 this elongated shape is changed to a similar shape but having its major axis parallel to the axes of rollers 15, that is, at right angles to the preceding major axis (FIG. 8), so that the test-tube will undergo two successive deformations.

In case of rebound, that is, of a change in the direction of application of stress to the ball-joints 5, 6 during the actuation of the device, the reverse movement following the first movement will be attended by another plastic deformation. Thus, energy will be absorbed in each direction of this reciprocating movement.

The mass M to be protected, moving at a velocity V to be reduced to zero, has a kinetic energy $MV^2/2$ which must be absorbed by the device.

The cross-sectional area of the test-tube, the strength of the material from which it is made and the degree of flattening applied thereto are so selected that the deceleration of the mass concerned remains within the permissible threshold. The length of the test-tube is such that the total plastic deformation thereof corresponds to the energy to be absorbed. As already mentionned hereinabove, the device is started more progressively due to the provision of means for weakening the test-tube in its intermediate portion. In fact, with holes 11 of variable diameter and variable relative spacing it is possible to preset the initial retaining effort.

To avoid any shock under abnormal circumstances such that in case the total energy were not absorbed before the stroke is completed, the test-tube would be centered on the ball-joint 6 by means of a core for increasing its resistance to plastic deformation and accentuate the deceleration of the movement. Similarly, a metal core is introduced into the free end of the test-tube for increasing the braking action during the final section of the stroke in the opposite direction of movement.

It will be readily understood that the presence of a likewise tubular reinforcement 12 (FIG. 16) in the test-tube will further improve the resistance of the carriage to its axial movement and that this resistance is subordinate to the thickness imparted to this reinforcement. Since the cross-sectional shape of the test-tube incompletely flattened by the rollers assumes by itself the shape of an "8" as shown in FIG. 5, the provision of a central reinforcing element in the form of a rigid blade 13 or of a plastics cylinder 14, will counteract this natural distortion. The combined use of these various methods for increasing the strength, and also of those which, in contrast thereto, provide a local weakening of the test-tube, make it possible to establish a predetermined law of the variation in the axial interaction effort as a function of the carriage stroke and, consequently, the energy absorption law of which a typical example is illustrated in FIG. 9 showing between two limit stops A and B the variation in the axial interaction effort (in ordinates) as a function of the movement (in abscissa) from one of the limit stops, the initial point being an intermediate point D. In this FIG. 9 it will be seen that if the energy absorption movement takes place from D to E, the absorbed energy is measured by means of the hatched area extending from the interaction effort curve to the abscissa line, from point D to point E.

It will be seen that the strength contemplated for the telescopic elements 1, 4 and anchoring ball-joints 3 and 6 is such that these elements can be re-used. Only the test-tube will have to be replaced after an operation of the device.

Figure 22:
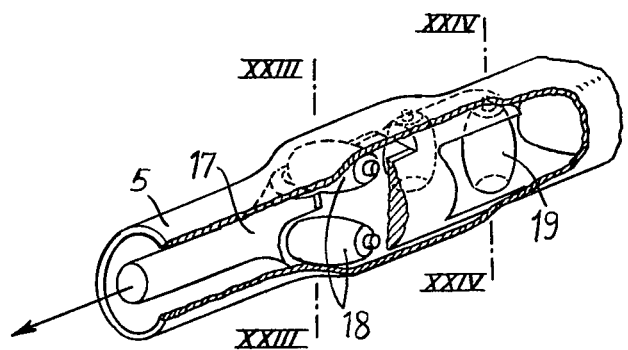
FIG. 22 illustrates diagrammatically a modified embodiment incorporating a test-tube of which the distortion is obtained by means of internal sliding members.
Figure 23:
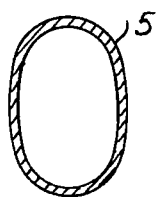
FIGS. 23 and 24 are cross sections taken along the lines XXIII—XXIII and XXIV—XXIV, respectively, of FIG. 22.
Figure 24:
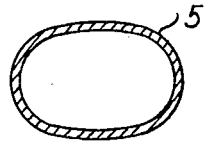

Although in the above disclosure it is contemplated to cause the kinetic energy to be absorbed by the gradual permanent distortion of the test-tube cross-section, which is obtained by causing a clamping member to move along this test-tube, it will readily occur to those conversant with the art hat a progressive deformation may also be obtained through different means or methods. More particularly, the progressive deformation of the test-tube may be obtained by causing the movement of a member, for example in the form of a cartridge, disposed internally of the test-piece forming tube, instead of externally of this tube. A typical example of a device of this character is illustrated diagrammatically in FIG. 22 in which the test-tube is still denoted 5 and the member 17 causing the progressive deformation of the tube, which is still in the form of a carriage, is movable within the test-tube so that the latter is caused to undergo its plastic deformation from inside. In this example, it is assumed that the carriage is provided with two successive pairs of suitable curved rollers comprising a first pair of rollers 18 having parallel axes and a second pair of rollers 19 having their axes parallel to each other but perpendicular to the axes of the first rollers 18, so that the axial movement of carriage 17 will cause two successive distortions to take place, thus giving the cross-sectional shapes illustrated in FIGS. 23 and 24, respectively. In case of rebound, the reverse sliding movement of the carriage is attended, due to the action of its rear pair of rollers, by another permanent distortion absorbing the rebound energy.

In this modified arrangement, the reinforcing means for improving the resistance of the test-tube to the carriage movements are provided inside the test-tube, for example in the form of sleeves or the like.

What we claim is:

1. A device for absorbing the kinetic energy resulting from a relative motion between two bodies, which comprises:

a first tube, a deformable test-tube being anchored and coaxially disposed within said first tube and presenting an intermediate portion of lesser transverse dimension than the remainder of the tube, a first ball-joint anchoring said first tube and said test-tube to one of said bodies, a second tube, a pressure member co-acting with said test-tube housed within and connected to said second tube which is adapted to move telescopically in relation to said first tube and which is anchored to the other of said bodies through a second ball-joint, said pressure member comprising at least one pair of parallel rollers mounted on a carriage, said rollers being spaced from one another a distance equal to the lesser transverse dimension of the test tube and normally contacting said intermediate portion of the test-tube, whereby relative telescoping movements of the first and second tubes will move said carriage and rollers relative to said test-tube to cause deformation of the test-tube moving between said rollers in portions adjacent to said intermediate portion thereof.

2. A device as claimed in claim 1, wherein said rollers are knurled in order to enable said rollers to roll without slipping on the test-tube surface.

3. A device as claimed in claim 1, wherein the wall thickness of said test-tube varies in such a way that the test-tube deformation effort varies as a function of the position of the carriage relative to said test-tube.

4. A device as claimed in claim 3, wherein the test-tube deformation effort is modified in the longitudinal direction by localized heat treatment of the material of the test-tube.

5. A device as claimed in claim 3, wherein the test-tube deformation effort is modified in the longitudinal direction by locally weakening the tube by means of holes.

6. A device as claimed in claim 3, wherein the test-tube deformation effort is modified in the longitudinal direction by reinforcing the test-tube locally by means of foreign members such as a variable-section internal tube.

7. A device as claimed in claim 3, wherein the test-tube deformation effort is modified in the longitudinal direction by reinforcing the test-tube locally by means of foreign members such as a variable-section external sleeve.

8. A device as claimed in claim 3, wherein the test-tube deformation effort is modified in the longitudinal direction by reinforcing the test-tube locally by means of foreign members such as a variable-section axial blade.

9. A device as claimed in claim 3, wherein the test-tube deformation effort is modified in the longitudinal direction by reinforcing the test-tube locally by means of foreign members such as a variable-section plastics core.

10. A device as claimed in claim 3, wherein the test-tube deformation effort is modified in the longitudinal direction by reinforcing the test-tube locally by means of foreign members such as a set of tubes of different lengths.

11. A device as claimed in claim 3, wherein the test-tube deformation effort is modified in the longitudinal direction by reinforcing the test-tube locally by means of a liquid or gaseous fluid under pressure.

12. A device as in claim 1, wherein the intermediate portion is of less external transverse dimension, said pressure member being disposed outside the test-tube.

* * * * *